(12) United States Patent
Janugani et al.

(10) Patent No.: US 11,489,956 B2
(45) Date of Patent: Nov. 1, 2022

(54) SYSTEMS AND METHODS FOR NOTIFICATION FORWARDING

(71) Applicant: Dish Network L.L.C., Englewood, CO (US)

(72) Inventors: Swapna Janugani, Englewood, CO (US); Joshua Engelbert, Elizabeth, CO (US)

(73) Assignee: Dish Network L.L.C., Englewood, CO (US)

( * ) Notice: Subject to any disclaimer, the term of this patent is extended or adjusted under 35 U.S.C. 154(b) by 308 days.

(21) Appl. No.: 16/206,042

(22) Filed: Nov. 30, 2018

(65) Prior Publication Data

US 2020/0177722 A1 Jun. 4, 2020

(51) Int. Cl.
*H04M 1/72412* (2021.01)
*H04W 4/20* (2018.01)
*H04N 21/478* (2011.01)
*H04W 4/80* (2018.01)
*H04N 21/41* (2011.01)
*H04W 80/12* (2009.01)

(52) U.S. Cl.
CPC .. *H04M 1/72412* (2021.01); *H04N 21/41265* (2020.08); *H04N 21/478* (2013.01); *H04W 4/20* (2013.01); *H04W 4/80* (2018.02); *H04W 80/12* (2013.01)

(58) Field of Classification Search
CPC .......... H04M 1/7253; H04M 1/72412; H04M 1/72409; H04M 1/575; H04M 1/57; H04M 1/72484; H04M 1/72415; H04W 4/80; H04W 4/20; H04W 80/12; H04W 88/02; H04N 21/478; H04N 21/41265; H04L 51/14; H04L 12/2827; H04L 51/04; H04L 51/043; H04L 51/24; H04L 51/34; H04L 51/38; H04L 67/22; H04L 67/26

See application file for complete search history.

(56) References Cited

U.S. PATENT DOCUMENTS

| 7,581,034 B2 | 8/2009 | Polivy et al. |
| 8,718,638 B2 * | 5/2014 | Yu ..................... H04M 1/72527 455/424 |

(Continued)

FOREIGN PATENT DOCUMENTS

CN 101197890 A * 6/2008

*Primary Examiner* — Matthew C Sams
(74) *Attorney, Agent, or Firm* — Jeremiah J. Baunach; VLP Law Group LLP

(57) ABSTRACT

Systems and methods for notification forwarding may include forwarding all or selected notifications generated by one or more applications running on a wireless mobile device to a television receiving device that is connected to the television. This forwarding may occur over the short-range wireless network or on a home wireless local area network on which the television receiving device is also present. The receiving device may cause the forwarded notifications to be displayed on the television while the television is also displaying other programming received from various other sources. The particular location on the presentation device to display the forwarded notification and the size, color and appearance of the notification may be selected by the user via a graphical user interface of the wireless mobile device and/or the television receiving device.

20 Claims, 7 Drawing Sheets

(56) References Cited

U.S. PATENT DOCUMENTS

| | | | |
|---|---|---|---|
| 8,813,134 B2* | 8/2014 | Goodman | H04M 3/42042 |
| | | | 725/62 |
| 2007/0049255 A1* | 3/2007 | Bhakta | H04W 88/02 |
| | | | 455/412.2 |
| 2007/0121584 A1 | 5/2007 | Qiu et al. | |
| 2011/0098086 A1* | 4/2011 | Nagata | H04M 1/21 |
| | | | 455/557 |
| 2011/0281568 A1* | 11/2011 | Le Clech | H04M 1/575 |
| | | | 455/415 |
| 2011/0307932 A1 | 12/2011 | Fan et al. | |
| 2012/0172088 A1 | 7/2012 | Kirch et al. | |
| 2016/0173683 A1* | 6/2016 | Abreu | H04L 51/24 |
| | | | 455/414.1 |
| 2017/0063758 A1* | 3/2017 | Gao | H04M 1/72527 |
| 2018/0091465 A1* | 3/2018 | Faaborg | H04L 51/14 |

* cited by examiner

SYSTEMS AND METHODS FOR NOTIFICATION FORWARDING

TECHNICAL FIELD

The disclosure relates to delivering notifications and, particularly, to notification forwarding.

BRIEF SUMMARY

Many people are relying on their wireless mobile devices, such as cellular telephones, smartphones, tablets, mobile gaming devices and media players, etc., to receive not only phone call notifications, but notifications regarding everything from important work emails and chat messages to weather updates and package deliveries. Such wireless mobile device notifications may in some instances appear as pop-up messages on the display of the wireless mobile device (i.e., as "push notifications") so that the user can quickly assess and address the notification. Such notifications may also be generated by different applications running the wireless mobile device and may be generated as a result of networked services external to the wireless mobile device.

However, a user may not always have the user's wireless mobile device with the user or within reach while watching television or other programming. Also, the user may not always be looking at the display of the wireless mobile device, may have audio of the wireless mobile device turned down or off, may have a hearing disability, or may find it distracting to have to look away from the television screen while enjoying programming just in order to view a notification being displayed on the wireless mobile device. Furthermore, the user may desire to be alerted of only notifications from particular mobile device applications, notifications deemed especially important or certain types of notifications while watching particular television programming or a movie at home. Thus, the wireless mobile device may forward all or selected notifications generated by one or more applications running on the wireless mobile device to a television receiving device that is connected to the television for display on the television. This forwarding may occur over a short-range wireless network or on a home wireless local area network on which the television receiving device is also present. This has the advantage of avoiding sending push notifications from the wireless mobile device over the Internet or cellular network to the television receiving device, thus increasing the speed of receiving and displaying the notification on the user's television, increasing privacy and avoiding the television receiving device needing to have Internet connectivity to receive and display such notifications on the user's television. The receiving device may cause the forwarded notifications to be displayed on the television while the television is also displaying other programming received from various other sources (e.g., satellite television, cable television and/or streaming media sources).

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
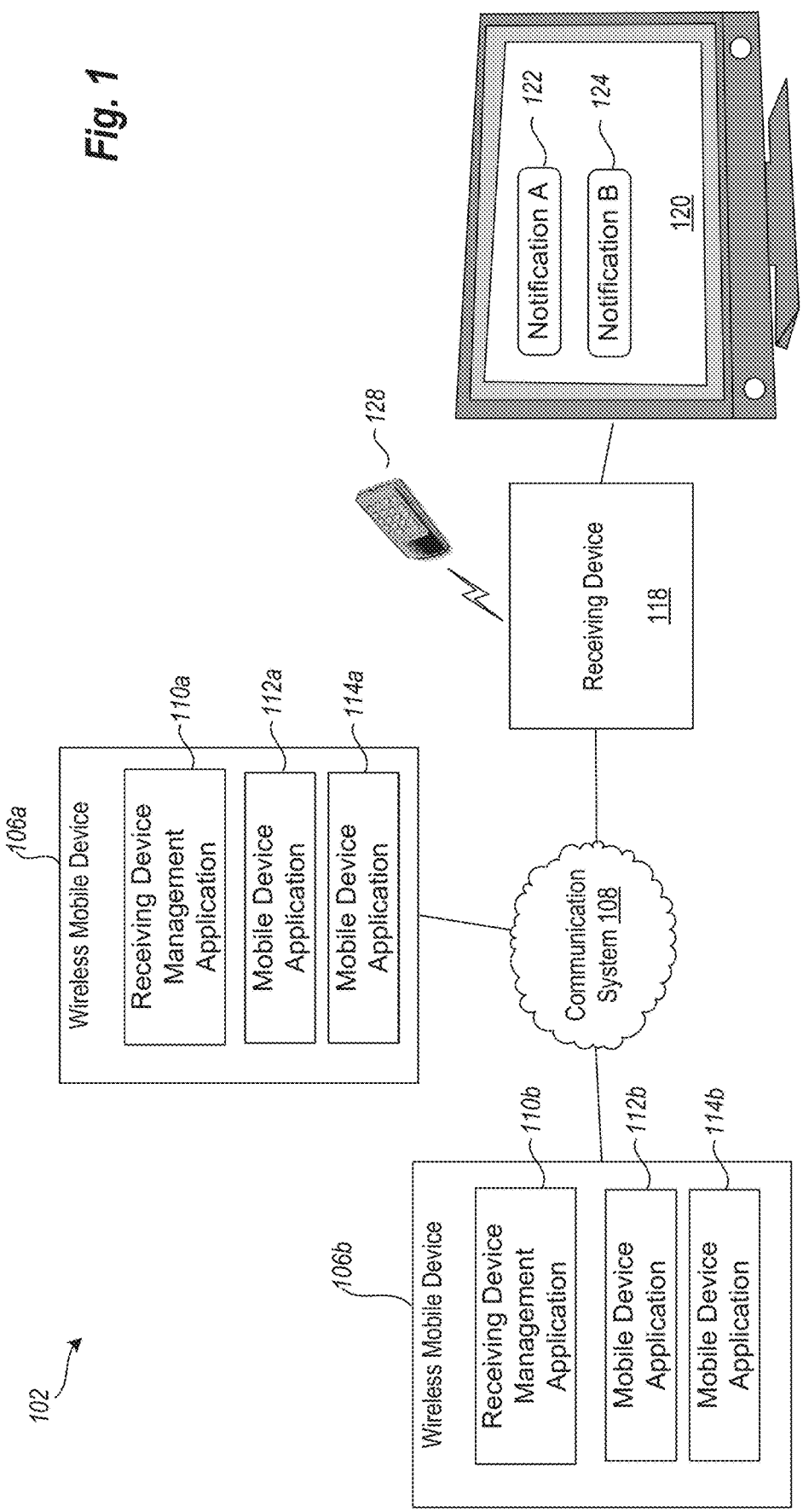
FIG. 1 is a block diagram illustrating an example environment in which embodiments of notification forwarding may be implemented, according to one example embodiment.

FIG. 1 is a block diagram illustrating an example environment 102 in which embodiments of notification forwarding may be implemented, according to one example embodiment.

Before providing additional details regarding the operation and constitution of systems and methods for notification forwarding, the example environment 102, within which such systems and methods may operate, will be described.

In the environment 102, audio, video, and/or data service providers, such as television service providers, provide their customers a multitude of video and/or data programming (hereafter, collectively and/or exclusively "programming"). Such programming is often provided by use of a receiving device 118 communicatively coupled directly or indirectly to a presentation device 120 configured to receive the programming. The programming may include any type of media content, including, but not limited to: television shows, news, movies, sporting events, documentaries, advertisements, web videos, media clips, etc. in various formats including, but not limited to: standard definition, high definition, 4 k Ultra High-Definition (HD), Ultra HD (UHD), AVI (Audio Video Interleave), FLV (Flash Video Format), WMV (Windows Media Video), MOV (Apple QuickTime Movie), MP4 (Moving Pictures Expert Group 4), WAV (Waveform Audio File Format), MP3 (Moving Picture Experts Group Layer-3 Audio), WMA (Windows Media Audio), PCM (Pulse-Code Modulation), AIFF (Audio Interchange File Format), AAC (Advanced Audio Coding), LPCM (Linear pulse code modulation), and OGG (Vorbis).

The receiving device 118 may interconnect to one or more communications media, sources or other devices (such as a cable head-end, satellite antenna, telephone company switch, Ethernet portal, off-air antenna, other receiving devices, or the like) that provide the programming. The receiving device 118 commonly receives a plurality of programming by way of the communications media or sources described in greater detail below. Based upon selection by a user, the receiving device 118 processes and communicates the selected programming to the presentation device 120.

For convenience, examples of a receiving device 118 may include, but are not limited to, devices such as: a "media player," "streaming media player," "television converter," "receiver," "set-top box," "television receiving device," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to play back programming. Further, the receiving device 118 itself may include user interface devices, such as buttons, switches and touch sensitive display panels. In many applications, a remote-control device ("remote") 128 is operable to control the receiving device 118 and/or the presentation device 120. The remote 128 typically communicates with the receiving device 118 using a suitable wireless medium, such as infrared ("IR"), radio frequency ("RF"), or the like.

Examples of a presentation device 120 may include, but are not limited to: a television ("TV"), a mobile device, a smartphone, a tablet device, a personal computer ("PC"), a sound system receiver, a digital video recorder ("DVR"), a Digital Video Disc ("DVD") device, game system, or the like. Presentation devices 120 may employ a display, one or more speakers, and/or other output devices to communicate video and/or audio content to a user. In many implementations, one or more presentation devices 120 are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

In some embodiments, a content provider (not shown) provides program content, such as television content, to a distributor (not shown). Example content providers include television stations which provide local or national television programming and special content providers which provide streaming media programming, premium based programming, or pay-per-view programming. Program content (i.e., a program including or not including advertisements), is communicated to the program distributor from the content provider through suitable communication media such as telephone systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems to which the receiving device 118 may be connected. In at least one embodiment, the received program content is converted by the program distributor into a suitable signal (a "program signal") that is ultimately communicated to the receiving device 118. Other embodiments of the receiving device 118 may receive programming from program distributors and/or directly from content providers via locally broadcast RF signals, cable, fiber optic, Internet media, or the like.

The receiving device 118 may also be connected to another local network, such as a user's home wireless network (e.g., a short-range wireless network or a wireless local area network), generally illustrated as communication system 108 for convenience. For example, the communication system 108 may be a system for communicating via Wi-Fi interface(s), Bluetooth® interfaces, short range wireless interfaces, personal area network interfaces, Ethernet port(s), and/or other network ports of the wireless mobile device 106a, wireless mobile device 106b and receiving device 118. In other embodiments, communication system 108 may include many different types of communication media, now known or later developed. Non-limiting media examples include telephone systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems. In various different embodiments, communication system 108 may include any telecommunications network, computer network, or combination of telecommunications and computer networks that enables applicable communication between the various devices connected to the communication system 108 shown in FIG. 1. For example, a communications network of communication system 108 may include a local area network that uses wireless fidelity (Wi-Fi) high frequency radio signals to transmit and receive data over distances of a few hundred feet. The local area network may be a wireless local area network (WLAN) based on the Institute of Electric and Electronic Engineers (IEEE) 802.11 standards. However, other wired and wireless communications networks and protocols may be used to link the various devices and systems shown in FIG. 1. Thus, systems shown in FIG. 1 may have various applicable wireless transmitters and receivers and, in the case of using a Wi-Fi wireless link, may also have the corresponding executable Wi-Fi compatible network communications software that initiates, controls, maintains or manages the wireless link between the systems shown in FIG. 1 and the various other devices and systems within communication system 108 over the Wi-Fi signal of communication system 108.

The communication system 108 may comprise connections to the systems shown in FIG. 1 that provide services to the systems shown in FIG. 1, and may itself represent multiple interconnected networks. For instance, in some embodiments, wired and wireless enterprise-wide computer networks, intranets, extranets, and/or the Internet may be included in or comprise a part of communication system 108. Embodiments may include various types of communication networks including other telecommunications networks, cellular networks and other mobile networks. There may be any variety of computers, switching devices, routers, bridges, firewalls, edge devices, multiplexers, phone lines, cables, telecommunications equipment and other devices within communication system 108 and/or in the communications paths between the receiving device 118, wireless mobile device 106a and wireless mobile device 106b. Some or all of such equipment of communication system 108 may be owned, leased or controlled by third-party service providers.

In accordance with an aspect of the disclosure, the receiving device 118, wireless mobile device 106a and wireless mobile device 106b may contain discrete functional program modules that might make use of an application programming interface (API), or other object, software, firmware and/or hardware, to request services of each other (e.g., notification and/or streaming media services) and/or one or more of the other entities within or connected to the communication system 108.

For example, communication can be provided over a communications medium, e.g., client and server systems running on any of the receiving device 118, wireless mobile device 106a and wireless mobile device 106b. These client and server systems may be coupled to one another via transmission control protocol/internet protocol (TCP/IP) connection(s) for high-capacity communication. The "client" is a member of a class or group that uses the services (e.g., streaming media services) of another class or group to which it is not related. In computing, a client is a process, i.e., roughly a set of instructions or tasks, executed by hardware that requests a service provided by another program. Generally, the client process utilizes the requested service without having to "know" any working details about the other program or the service itself. In a client/server architecture, particularly a networked system, a client is usually a computer or device that accesses shared network resources provided by another computer or device, e.g., a server. In the example of FIG. 1, the receiving device 118 may be a client requesting the services (e.g., push notification forwarding services) of the wireless mobile device 106a and/or wireless mobile device 106b acting as server(s). However, any entity in FIG. 1, including the receiving device 118, can be considered a client, a server, or both, depending on the circumstances. For example, the wireless mobile device 106a and/or wireless mobile device 106b may be a client requesting the services (e.g., push notification display services) of the receiving device 118 acting as a server.

One or more cellular towers and stations may be part of a cellular network that is either part of or separate from the communication system 108 and may be communicatively linked by one or more communications networks or communication mediums that are separate from or within the communication system 108 (e.g., using a cellular or other wired or wireless signal) in order to facilitate sending and receiving information in the form of synchronous or asynchronous data. This communication may be over a wireless signal on the cellular network of communication system 108 using applicable combinations and layers of telecommunications and networking protocols and standards such as fourth generation broadband cellular network technology (4G), Long Term Evolution (LTE), HTTP and TCP/IP, etc.

The wireless mobile device 106a and wireless mobile device 106b may be any wireless mobile device with Internet connectivity and including at least one computer processor and at least one memory coupled to the at least one computer processor and may include wireless communications functionality to communicate with the receiving device 118 as described herein. For example, a wireless mobile device may include, but is not limited to, devices such as: cellular telephones, smartphones, tablets, media players, mobile gaming devices, personal digital assistants (PDAs), MP3 players, etc. There may be fewer or more wireless mobile devices in the environment 102 than shown in FIG. 1 and the number of wireless mobile devices may change dynamically in various embodiments without interrupting the operation of the notification forwarding systems described herein. The physical environment of communication system 108, including the receiving device 118, wireless mobile device 106a and wireless mobile device 106b, may have connected devices such as computers and may have or be described as comprising other various digital devices such as smartphones, tablets, personal digital assistants (PDAs), televisions, MP3 players, etc.; software objects such as interfaces, Component Object Model (COM) objects; and the like.

There are a variety of systems, components, and network configurations that may also support distributed computing and/or cloud-computing environments within the communication system 108. For example, computing systems may be connected to the communication system 108, connected to one or more of the devices shown in FIG. 1, or may be connected together within the communication system 108 by wired or wireless systems, by local networks or by widely distributed networks. Many networks are coupled to the Internet, which, in some embodiments, provides an infrastructure for widely distributed computing and encompasses many different networks. Any such infrastructures, whether coupled to the Internet or not, may be used in conjunction with, be connected to, or comprise part of the communication system 108.

Although not required, the embodiments will be described in the general context of computer-executable instructions, such as program application modules, objects, or macros stored on computer- or processor-readable storage media and executed by a computer or processor. Those skilled in the relevant art will appreciate that the illustrated embodiments as well as other embodiments can be practiced with other system configurations and/or other computing system configurations, including hand-held devices, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network such as communication system 108. In a distributed computing environment, program modules may be located in both local and remote memory storage devices.

In addition, the receiving device 118 may provide various forms of content and/or services to various devices, including wireless mobile device 106a and wireless mobile device 106b. Also or alternatively, the wireless mobile device 106a and/or wireless mobile device 106b may provide various forms of content and/or services to various devices, including receiving device 118. For example, receiving device 118 or a remote server (not shown) associated with an account of the user of the wireless mobile device and/or receiving device 118 may also provide content and/or notification information to wireless mobile device 106a and/or wireless mobile device 106b, or other additional content or metadata. This providing of content and/or notification information may be performed by the receiving device management application 110a of wireless mobile device 106a and/or the receiving device management application 110b of wireless mobile device 106b. The receiving device management application 110a and receiving device management application 110b may be individual software applications running on the corresponding wireless mobile device that manages communication, user account information, program navigation, streaming services, content selection and control of the receiving device 118 via the respective wireless mobile device.

The receiving device 118 or remote server associated with an account of the user of the wireless mobile device and/or receiving device 118 may also provide metadata regarding the content such as title, genre, program guides, broadcast scheduling information, reviews, cast, content type and other information regarding the content via receiving device management application 110a of wireless mobile device 106a and/or the receiving device management application 110b of wireless mobile device 106b. The receiving device management application 110a of wireless mobile device 106a and/or the receiving device management application 110b of wireless mobile device 106b, the receiving device 118 or a remote server associated with an account of the user of the wireless mobile device and/or receiving device 118 may provide an electronic program guide or other menu system data or software for a user of the receiving device 118 to organize, navigate and select the available content.

In an example embodiment, a user may receive notifications from various mobile device software applications running on the user's wireless mobile device (e.g., wireless mobile device 106a and/or wireless mobile device 106b). Such mobile device applications are represented by mobile device application 112a and mobile device application 114a (running on wireless mobile device 106a) and mobile device application 112b and mobile device application 114b (running on wireless mobile device 106b). There may be fewer or additional mobile device applications each running on fewer or additional wireless mobile devices in various embodiments. For example, such mobile device applications may include, but are not limited to: messaging applications, texting applications, phone call management applications, social media applications, communications applications, video applications, chat applications, calendar applications, email applications, map applications, ride-sharing applications, food delivery applications, e-commerce applications, order delivery applications, order tracking applications, package delivery applications, weather applications, location services applications, photo sharing applications, business applications, project management applications, news applications, emergency alert applications, and home security applications, etc. Such applications often provide notifications to the user of the wireless mobile device (e.g., wireless mobile device 106a) that appear (i.e., "pop up") on the screen of the wireless mobile device.

In some embodiments, the user may often provide various permissions via the system management settings and/or specific application settings available on the wireless mobile device 106a indicating when, how, where and under what conditions certain notifications are to appear on the display of the wireless mobile device 106a. For example, the user of wireless mobile device 106a may input a setting such that package delivery notifications from mobile device application 112a pop up on the display of wireless mobile device 106a at any time, even when the user is not currently using or interacting with mobile device application 112a. Such notifications generated by a particular wireless mobile device application that pop up on the display of wireless mobile device without a specific request are often referred to as "push notifications".

However, a user may not always have the user's wireless mobile device with them or within reach, may not always be looking at the display of the wireless mobile device, may have audio of the wireless mobile device turned down or off, may have a hearing disability, or may find it distracting to have to look away from the television screen while enjoying programming being displayed on the television just in order to view a notification being displayed on the wireless mobile device. Thus, wireless mobile device 106a, for instance, may forward the notifications generated by one or more of the mobile device applications (e.g., mobile device application 112a and mobile device application 114a) to the receiving device 118 that is connected to the presentation device 120 (e.g., a television) for display on the presentation device 120. This display of the forwarded notification from the wireless mobile device 106a may occur while the presentation device 120 is displaying programming received by the receiving device 118 from a satellite television system, cable television system, streaming service and/or other content or programming service system. For example, the user may provide input to the receiving device management application 110a, indicating a setting to have notifications generated by mobile device application 112a be automatically forwarded by the receiving device management application 110a to the receiving device 118 for display on the presentation device 120. The user may provide input via a graphical user interface of the receiving device management application 110a selecting which mobile device application (e.g., mobile device application 112a and/or mobile device application 114a) is to have notifications forwarded, the type of notifications to forward, the level of detail of the notification to display on the presentation device 120, how long the notification is to appear, where on the presentation device screen to display the notification, how visual elements of the notification are to appear (e.g., transparency of the notification, color of the notification, shape of the notification, font size, etc.), whether an audible alert is also to be output from the receiving device 119 and/or presentation device 120, and under what circumstances, the notifications are to be forwarded.

For example, the user may indicate to forward or not to forward (or display or not display) notifications based on particular programming content currently being displayed on the presentation device 120; a particular mobile application that generated the notification; particular titles of programming content currently being displayed; particular type of programming content currently being displayed; specific time of day, day of week, and/or time widows; a particular user being logged in, identified, verified, detected to be using, detected to be viewing and/or associated with the receiving device 118 and/or the wireless mobile device 106a. In some embodiments, the receiving device 118, presentation device and/or wireless mobile device 106a may detect via facial recognition, retinal scan, motion sensing, voice recognition and/or other biometric input received from a biometric sensor of the receiving device 118 (represented as other I/O devices in FIG. 2), presentation device and/or wireless mobile device 106a that a particular user is currently using and/or viewing the receiving device 18 and/or the presentation device 120. The receiving device 118 will then implement specific notification rules and/or adjust settings for forwarding of the notifications generated by and/or received from the wireless mobile device 106a and/or other wireless mobile devices according to the permissions and/or other preferences previously input associated with the particular user.

In one embodiment, the user may set to pause the notifications generated by wireless mobile device 106a being forwarded to the receiving device 118 when the receiving device 118 is tuned to a particular channel. In some embodiments, the user may set a "do not disturb" setting such that all notifications generated by any application running on any wireless mobile device are not forwarded by the receiving device 118 for display on the presentation device 120. Thus, the functionality and operation of the technologies of television and wireless electronic notifications and messaging over computer networks are improved by providing automated forwarding to display notification messages received on the user's mobile device on the user's television, increasing the speed and convenience to receive notifications on whichever device the user is viewing at the moment without the user having to perform additional steps after initial setup. This technical solution solves the technical problem of how to receive and display relevant push notifications that one receives on their wireless mobile device on other devices the user may be viewing (e.g., the user's television).

The technologies of television and wireless electronic notifications and messaging over computer networks are also improved by improving navigation through electronic program guide and menu options on the television by having the notifications appear on the television while programming is being presented without the user having to navigate through a television menu navigation system, mobile device menu navigation system, receiving device menu navigation system or electronic program guide menu to select to view notifications as each is received. This saves time and increases performance of the graphical user interface. Detecting that a particular user is viewing the television and forwarding messages for display on the television based on such detection of the particular user further improves the technology of television and wireless electronic notifications and messaging over computer networks by saving data usage, enhancing the television user interface operation and improving navigation through the television menu system by avoiding displaying unneeded and/or unnecessary information not relevant to the user or undesired by the user that the user must then close or cancel via the menu navigation system of the television and/or receiving device.

In some embodiments, the receiving device 118 may detect presence of wireless mobile devices on the same short-range wireless network or on the same wireless local area network on which a receiving device 118 is also present. Such detection may initiate or otherwise cause the receiving device 118 to start receiving or otherwise obtaining notifications generated by the wireless mobile device to display on the presentation device 120. For example, the receiving device 118 may detect the presence of wireless mobile device 106a on the communication system 108, which, in one example embodiment, may comprise the same short-range wireless network or the same wireless local area network on which a receiving device 118 is also present. In response to the detection the presence of wireless mobile device 106a on the communication system 108, the receiving device 118 may enable the wireless mobile device 106a to begin to forward notifications (e.g., push notifications) generated by one or more of the mobile device applications running on wireless mobile device 106a. In some embodiments, this may be performed by the receiving device 118 sending a communication, request, authorization signal and/or authorization code over communication system 108 to the receiving device management application 110a of the wireless mobile device 106a. For example, wireless mobile device 106a may start to forward to the receiving device 118 push notifications generated by mobile device application 112a (e.g., a social media messaging application) and/or push notifications generated by mobile device application 114a (e.g., a stock market news alert application).

In some embodiments, wireless mobile device 106a may detect presence of the receiving device 118 on the same short-range wireless network or on the same wireless local area network on which the wireless mobile device 106a is also present. Such detection may initiate or otherwise cause the wireless mobile device 106a to start forwarding to the receiving device 118 notifications generated by the wireless mobile device 106a to display the notifications on the presentation device 120. The receiving device management application 110a running on the wireless mobile device 106a may authenticate the receiving device 118 and/or the presentation device 120 (e.g., via the receiving device 118) as being associated with the wireless mobile device 106a and/or a user account associated with the wireless mobile device 106a as a condition before beginning to forward such notifications to the receiving device 118 for display on the presentation device 120. The receiving device management application 110a running on the wireless mobile device 106a may also or instead determine which of a plurality of notifications to forward to the receiving device 118 based on user permission settings on the wireless mobile device 106a, such as via the receiving device management application 110a running on the wireless mobile device 106a. For example, in some embodiments, the user may provide various permissions, preferences and/or access privileges, via the system management settings and/or specific application settings available on the wireless mobile device 106a indicating when, how, where, whether and under what conditions certain notifications generated by particular wireless mobile device applications are to be forwarded to the receiving device 118 and/or appear on the display of the presentation device 120. For example, the user of wireless mobile device 106a may input a setting via the receiving device management application 110a and/or via the various mobile device applications running on wireless mobile device 106a (e.g., mobile device application 112a and/or mobile device application 114a) to indicate which, if any of the applications running on wireless mobile device 106a are to have the notifications generated by that application forwarded to the receiving device 118 for display on the presentation device 120. In some embodiments, the notification generated by the mobile device applications may be forwarded with an indication whether to display the notification on the presentation device 120 according to such permissions, preferences and/or access privileges set by the user.

In one example, the user of wireless mobile device 106a may set access privileges for mobile device application 112a to have notifications generated by that application be forwarded to the receiving device 118 for display on the presentation device 120 (e.g., as notification A 122 and notification B 124). At the same time, the user of wireless mobile device 106a may set access privileges for mobile device application 114a to have notifications generated by that application not be forwarded to the receiving device 118 for display on the presentation device 120. Such access privileges may be set based on input received indicative of selection of one or more selectable options on a graphical user interface generated by the wireless mobile device 106a, the receiving device 118 and/or a remote system or device (not shown) for the user to choose regarding whether to have notifications generated by the particular mobile device application be displayed on the presentation device 120. Such permissions, preferences and/or access privileges indicating when, how, where, whether and under what conditions certain notifications generated by particular wireless mobile device applications are to be forwarded to the receiving device 118 and/or appear on the display of the presentation device 120 may be saved in the notification rules storage 216, the mobile device 106a and/or a remote storage system accessible by the wireless mobile device 106a and/or the receiving device 118.

The receiving device management application 110a running on the wireless mobile device 106a may forward a selected group of the plurality of notifications to the receiving device 118 for display on the presentation device 120 based on the determination that the wireless mobile device 106a is present on the same short-range wireless network or on the same wireless local area network as the receiving device 118 and based on the determination of which of the plurality of notifications to forward.

In some embodiments, such forwarding of the notifications generated by wireless mobile device 106a may include forwarding directly from the applicable mobile device application (e.g., mobile device application 112a and mobile device application 114a) to the receiving device 118. In other embodiments, the receiving device management application 110a may intercept or otherwise capture such notifications generated by mobile device application 112a and mobile device application 114a and then forward the notifications to the receiving device 118 for display on the presentation device 120 as notification A 122 and notification B 124. In some embodiments, the receiving device management application 110a may edit the notification content and/or format according to user preferences and/or according to format requirements of the presentation device 122 before forwarding the notification for display on the presentation device 120. In some embodiments, the receiving device 118 may make some or all of such edits before displaying the notifications on the presentation device 120 as notification A 122 and notification B 124. For example, the receiving device 118 and/or wireless mobile device 106*a* may determine a level of detail of the notification to display on the presentation device 120 based on input received indicative of selection of one or more of the selectable options for the user to choose regarding the level of detail of notifications to display on the presentation device 120. The receiving device 118 and/or wireless mobile device 106*a* may then edit the wireless mobile device notification generated by wireless mobile device 106*a* based on this determined level of detail of the wireless mobile device notification to display on the presentation device 120 and then display the edited notification on the presentation device 120 as notification A.

In some embodiments, multiple notification messages may be displayed simultaneously, concurrently or partially concurrently on the presentation device 120 as notification A 122 and notification B 124. In other embodiments, in order to avoid blocking a large amount of programming displayed on the presentation device 120, the user may select via a user interface of the wireless mobile device 106*a*, the remote control 128, receiving device 118 and/or presentation device 120, an option to display on the presentation device 120 a selected maximum number of notifications at one time. Each notification (e.g., notification A 122 and notification B 124) may disappear automatically within a selected timeframe and/or upon canceling or clearing of the notification by user via the wireless mobile device 106*a* and/or remote control 128. In some embodiments, the user may also use the remote control 128 to navigate to select a currently displayed notification (e.g., Notification A 122) to expand the notification, display more detail regarding the notification, or to initiate display of a menu system on the presentation device 120 to enable the user to view and select previous notifications generated by the particular mobile device application that generated the selected notification. Such currently displayed and previous notifications may be saved on and/or retrieved, via communication system 108 as applicable, by the corresponding wireless mobile device that generated the notification (e.g., wireless mobile device 106*a* or wireless mobile device 106*b*), the receiving device 118, the presentation device 120 and/or a remote server accessible by the corresponding wireless mobile device that generated the notification.

The wireless mobile device 106*a* (e.g., the receiving device management application 110*a* of wireless mobile device 106*a*) may display or otherwise provide user selectable options available on the wireless mobile device 106*a* for the user to indicate permission settings and user preferences regarding and/or which applications are allowed to forward push notifications (or have their notifications forwarded) and/or which receiving devices (e.g., receiving device 118) and/or presentation devices (e.g., presentation device 120) are allowed to receive push notifications generated by the wireless mobile device 106*a* and/or to receive push notifications generated by particular application running on the wireless mobile device 106*a*. For example, the receiving device management application 110*a* may provide a list of available receiving devices and/or presentation devices to which notifications generated by wireless mobile device 106*a* may be forwarded. In some embodiments, the list may include identifiers of the individual available receiving devices and/or presentation devices and be generated based on which receiving devices and/or presentation devices are detected by the wireless mobile device 106*a* to be on the same network as the wireless mobile device 106*a*. Such a list may also include other devices whose device identification information is input by the user.

In one example, there may be multiple set-top boxes and connected presentation devices within a user's home, only some of which the user may desire to have the notifications generated on their wireless mobile device forwarded to. Via a user interface on the wireless mobile device 106*a* generated by the receiving device management application 110*a*, the user may select which of the available devices to have push notification forwarded to for display. In some embodiments, if the user has multiple wireless mobile devices associated with the user and/or the user's household (e.g., the user manages their children's wireless mobile devices), the user may select which set-top boxes and/or connected presentation devices are to be forwarded notification from which wireless mobile devices. In various embodiments, the user may select user selectable options as described herein via the applicable wireless mobile device and/or via the menu system of the receiving device 118 and/or presentation device 120 via the remote control 128.

The above description of the environment 102 and the various devices therein, is intended as a broad, non-limiting overview of an example environment in which various embodiments of notification forwarding may be implemented. FIG. 1 illustrates just one example of an environment and the various embodiments discussed herein are not limited to such environments. In particular, environment 102 and the various devices therein, may contain other devices, systems and/or media not specifically described herein.

Example embodiments described herein provide applications, tools, data structures and other support to implement notification forwarding. Other embodiments of the described techniques may be used for various purposes, including, but not limited to, notification forwarding to various types of receiving devices (either remote or local), such as audio and DVD players, digital recorders, computers, peripherals, televisions, mobile devices, telephones, and other electronic devices, etc. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
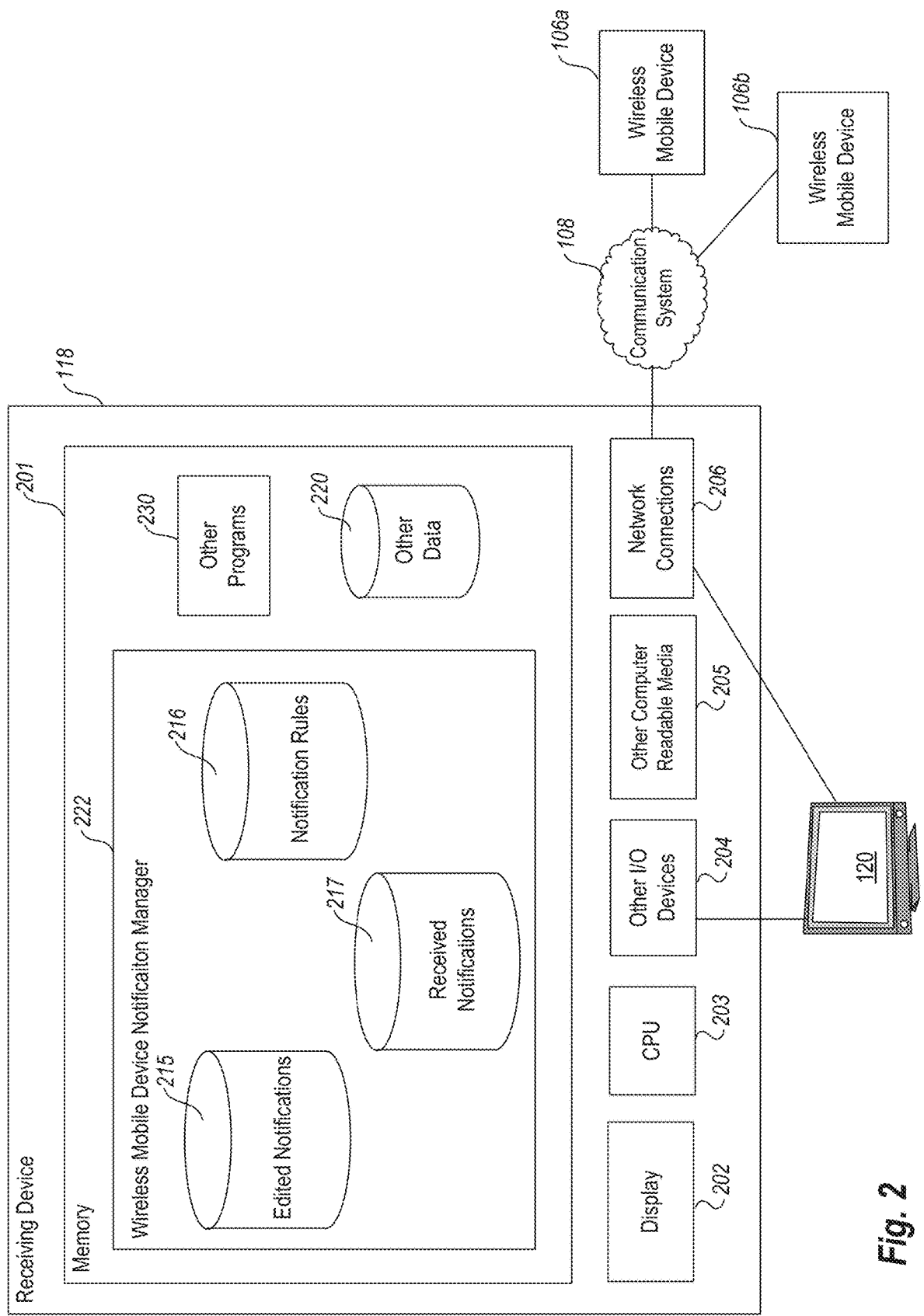
FIG. 2 is a block diagram illustrating elements of an example receiving device used in notification forwarding, according to one example embodiment.

FIG. 2 is a block diagram illustrating elements of an example receiving device 118 used in notification forwarding, according to one example embodiment.

In one embodiment, the receiving device 118 is a device configured to play media content on a presentation device. The receiving device 118 may display programming and/or play audio on a presentation device, such as on a display or speaker. The receiving device 118 may also be configured to receive and record such content from remote sources. In some embodiments, the receiving device 118 is a presentation device, such as a television, smartphone, smart speaker, internet appliance, home security receiving device, or tablet device, or may be a set-top box or digital video recorder (DVR) device.

Note that one or more general purpose or special purpose computing systems/devices may be used to operate the receiving device 118; determine presence of wireless mobile devices on communication system 108, such as a short-range wireless network or a wireless local area network on which the receiving device 118 is also present; receive from the wireless mobile devices wireless mobile device notifications for one or more users of the wireless mobile devices over the communication system 108; and, in response to receiving wireless mobile device notifications from the wireless mobile device, display the wireless mobile device notifications on a presentation device connected to the receiving device 118 while the presentation device displays programming received from the receiving device 118. Some or all of such operations may be performed and/or controlled by the receiving device wireless mobile device notification manager 222. In addition, the receiving device 118 may comprise one or more distinct computing systems/devices and may span distributed locations. Furthermore, each block shown may represent one or more such blocks as appropriate to a specific embodiment or may be combined with other blocks. Also, the receiving device wireless mobile device notification manager 222 may be implemented in software, hardware, firmware, or in some combination to achieve the capabilities described herein.

In the embodiment shown, receiving device 118 comprises a computer memory ("memory") 201, a display 202, one or more Central Processing Units ("CPU") 203, Input/Output devices 204 (e.g., button panel, RF or infrared receiver, light emitting diode (LED) panel, liquid crystal display (LCD), USB ports, digital audio, High-Definition Multimedia Interface (HDMI) ports, other communication ports, and the like), other computer-readable media 205, and network connections 206 (e.g., Wi-Fi interface(s), Bluetooth® interface, short range wireless interface, personal area network interface, Ethernet port(s), and/or other network ports). The wireless mobile device 106a and/or wireless mobile device 106b may also include such devices and interfaces as applicable to perform the operations and implement the functionality described herein associated with the wireless mobile device 106a and/or wireless mobile device 106b. The presentation device 120 shown in FIG. 1 may be coupled to the receiving device 118 via one or more Input/Output devices 204 and/or network connections 206, such as an HDMI port, Wi-Fi interface and/or Bluetooth® interface, for example.

The receiving device wireless mobile device notification manager 222 is shown residing in memory 201. In other embodiments, some portion of the contents and some, or all, of the components of the receiving device wireless mobile device notification manager 222 may be stored on and/or transmitted over the other computer-readable media 205. The components of the receiving device 118 and receiving device wireless mobile device notification manager 222 preferably execute on one or more CPUs 203 and facilitate the receiving, decoding, processing, selecting, recording, playback and displaying of programming content as well as the forwarding and displaying of notifications generated by wireless mobile devices, such as wireless mobile device 106a and wireless mobile device 106b, and controls how and under what conditions various notifications are to be forwarded to the receiving device 118 and displayed on the presentation device 120.

As described in more detail herein, the receiving device wireless mobile device notification manager 222 performs the functionality of the systems and methods for forwarding and displaying of mobile device notifications, including, but not limited to: receiving, from the receiving device management application running on wireless mobile device 106a, a push notification generated by a different application running on the first wireless mobile device; determining a user account associated with the mobile device notification; determining whether an indication has been received that a user associated with the user account is currently viewing the presentation device 120; and based on the determination whether the indication has been received that the user associated with the user account is currently viewing the presentation device 120, displaying the wireless mobile device notification on the presentation device 120 connected to the receiving device 118.

The wireless mobile device notification manager 22 may also determine the presence of a plurality of wireless mobile devices on the communication system. The wireless mobile device notification manager 22 may then receive a plurality of push notifications over the communication system 108, on which the receiving device 118 is also present. The notifications may be from different wireless mobile devices of the plurality of wireless mobile devices present on that same network. For example, the wireless mobile device notification manager 222 may determine that wireless mobile device 106a and wireless mobile device 106b are both present on the same short range wireless network (e.g., Bluetooth® network) as the receiving device 118 and then start receiving push notifications forwarded to the receiving device 118 from wireless mobile device 106a and wireless mobile device 106b over the same short range wireless network. This has the advantage of avoiding sending push notifications over the Internet to the receiving device 118, increasing the speed of receiving and displaying the notification on the user's television, increasing privacy and avoiding the receiving device 118 needing to have Internet connectivity to receive and display such notifications on the user's television. For each of the plurality of push notifications, as each of the plurality of push notifications is received by the wireless mobile device notification manager 220, the wireless mobile device notification manager 220 may cause the receiving device 118 to display the push notification on the presentation device 120. The particular location on the presentation device 120 to display the forwarded notification and the size, color and appearance of the notification may be selected by the user via a graphical user interface of the wireless mobile device and/or the receiving device 118.

In some embodiments, the wireless mobile device notification manager 220 may store forwarded notifications received from wireless mobile device 106a and/or wireless mobile device 106b in the received notifications storage 217 accessible by the wireless mobile device notification manager 222. The wireless mobile device notification manager 222 (or receiving device management application of the applicable wireless mobile device) may generate a graphical user interface selection menu providing selectable options for the user to choose regarding a level of detail of the received notifications to display on the presentation device 120 connected to the receiving device 118. For example, the level of detail may be selectable via the graphical user interface among: displaying a generic message that a notification has been received, displaying information regarding a message sender, displaying information regarding type of content of the wireless mobile device notifications, displaying specific content of the wireless mobile device notifications and displaying full content of the wireless mobile device notifications. Such selections and preferences regarding level of detail to display, as well as preferences regarding how and under what conditions to display particular notifications from particular wireless mobile devices and/or particular applications running on one or more mobile devices may be stored in the notification rules storage 216 accessible by the wireless mobile device notification manager 222 and/or may be stored on the applicable wireless mobile device.

The wireless mobile device notification manager 222 may then determine a level of detail of the received wireless mobile device notification to display on the presentation device 120 connected to the receiving device 118 or whether to display the wireless mobile device notification at all based on the input received indicative of selection of one or more of the selectable options for the user to choose regarding the level of detail to display whether to display the wireless mobile device notification at all. In some embodiments, such input may be received from the applicable wireless mobile device (e.g., wireless mobile device 106a and/or wireless mobile device 106b), either separately or along with the forwarded notification. The wireless mobile device notification manager 222 may retrieve the received notification from the received notifications storage 217 and edit the wireless mobile device notification based on the determined level of detail of the wireless mobile device notification to display on the presentation device 120. Such edited notifications may be stored in the edited notification storage 215.

The various factors and variables influencing how, when and under what circumstances to display notification messages forwarded from wireless mobile device 106a and/or wireless mobile device 106b may be stored in the notifications rules storage 216 and/or on the applicable wireless mobile device itself and may be selectable and adjustable by a user. For example, the receiving device wireless mobile device notification manager 222 may provide a graphical user interface menu or other controls enabling the user to select various options and values that affect, set or control the various factors and variables influencing how, when and under what circumstances to display notification messages forwarded from wireless mobile device 106a and/or wireless mobile device 106b. In one embodiment, such settings selectable by the user may control values affecting various variables and factors, including, but not limited to: the particular user associated with the particular wireless mobile device (which may be different for wireless mobile device 106a and wireless mobile device 106b); the particular mobile device application which generated the notification message; the user associated with the receiving device 118; the current user detected by the receiving device 118; to be viewing the presentation device 120; the time of day the notification is received; the content of the notification message; the type of content of the notification message; the user associated with the presentation device 120; the time of day; the time of week; the time of year; the time of month; particular time widows for displaying forwarded notification; the type of programming currently being displayed on the presentation device 120; whether the presentation device is currently displaying a commercial or other advertisement; ambient noise level; the particular channel the receiving device 118 is tuned to; particular titles of programming content currently being displayed on the presentation device 120; particular type of programming content currently being displayed on the presentation device 120, length of time to display the forwarded notification; visual characteristics of and/or additional metadata to display with the forwarded notification message; and the particular user logged in, identified, verified, detected to be using, detected to be viewing and/or associated with the receiving device 118 and/or the wireless mobile device from which the notification was forwarded.

The receiving device wireless mobile device notification manager 222 may also learn which notification messages to display, how long to display them for and under what conditions to display such notifications on the presentation device 120. The receiving device wireless mobile device notification manager 222 may also learn which other various factors and variables influencing display of the notifications as described above are desirable for a particular user or group of users for particular types of content based on previous settings, preferences and actions regarding display of the forwarded notifications.

For example, if a user is detected by the wireless mobile device notification manager 222 to habitually clear or ignore notification messages of a particular type, having particular characteristics, or displayed at a particular time, the receiving device wireless mobile device notification manager 222 may then automatically set and/or apply settings to automatically clear or determine not to display such messages matching those characteristics (e.g., having particular types of content) going forward for particular users or groups of users based on such learned preferences. As another example, if a user is detected by the wireless mobile device notification manager 222 and/or the wireless mobile device to frequently (e.g., over a certain threshold number of times within a given time period) pick up or otherwise interact with their wireless mobile device when receiving particular notifications or types of notifications on their mobile device while being detected to be viewing or in proximity to the presentation device 120, then the wireless mobile device notification manager 222 and/or the receiving device management application of the wireless mobile device may select such notifications for forwarding to the receiving device 118 for display on the presentation device 120 going forward.

Other code or programs 230 (e.g., an audio/video processing module, a program guide manager module, a Web server, and the like), and potentially other data repositories, such as data repository 220 for storing other data (user profiles, preferences and configuration data, etc.), also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the receiving device 118 and receiving device wireless mobile device notification manager 222 include an application program interface ("API") that provides programmatic access to one or more functions of the receiving device 118 and receiving device wireless mobile device notification manager 222. For example, such an API may provide a programmatic interface to one or more functions of the receiving device wireless mobile device notification manager 222 that may be invoked by one of the other programs 230, wireless mobile device 106a, wireless mobile device 106b, the receiving device management application 110a of wireless mobile device 106a, the receiving device management application 110b of wireless mobile device 106b, various mobile device applications running on wireless mobile device 106a (e.g., mobile device application 112a and/or mobile device application 114a), various mobile device applications running on wireless mobile device 106b (e.g., mobile device application 112b and/or mobile device application 114b) or some other module. In this manner, the API may facilitate the development of third-party software, such as user interfaces, plug-ins, adapters (e.g., for integrating functions of the receiving device wireless mobile device notification manager 222 into desktop and mobile applications), and the like to facilitate forwarding and displaying of wireless mobile device notifications (e.g., push notifications) as described herein.

In an example embodiment, components/modules of the receiving device 118 and receiving device wireless mobile device notification manager 222 are implemented using standard programming techniques. For example, the receiving device wireless mobile device notification manager 222 may be implemented as a "native" executable running on the CPU 203, along with one or more static or dynamic libraries. In other embodiments, the receiving device 118 and receiving device wireless mobile device notification manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving device 118 to perform the functions of the receiving device wireless mobile device notification manager 222. In one embodiment, instructions cause the CPU 203 or some other processor, such as an I/O controller/processor, to display forwarded wireless mobile device notifications on the presentation device 120 as described herein.

The embodiments described above may also use other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by a receiving device wireless mobile device notification manager 222 implementation. Also, other functions could be implemented and/or performed by each component/module, and in different orders, and by different components/modules, yet still achieve the functions of the receiving device 118 and the receiving device wireless mobile device notification manager 222.

In addition, programming interfaces to the data stored as part of the receiving device 118 and receiving device wireless mobile device notification manager 222, can be available by standard mechanisms such as through C, C++, C#, and Java APIs; libraries for accessing files, databases, or other data repositories; scripting languages such as XML; or Web servers, FTP servers, or other types of servers providing access to stored data. The edited notifications storage 215 and the notification rules storage 216 and received notifications storage 217 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the receiving device wireless mobile device notification manager 222.

Furthermore, in some embodiments, some or all of the components of the receiving device 118 and the receiving device wireless mobile device notification manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 3:
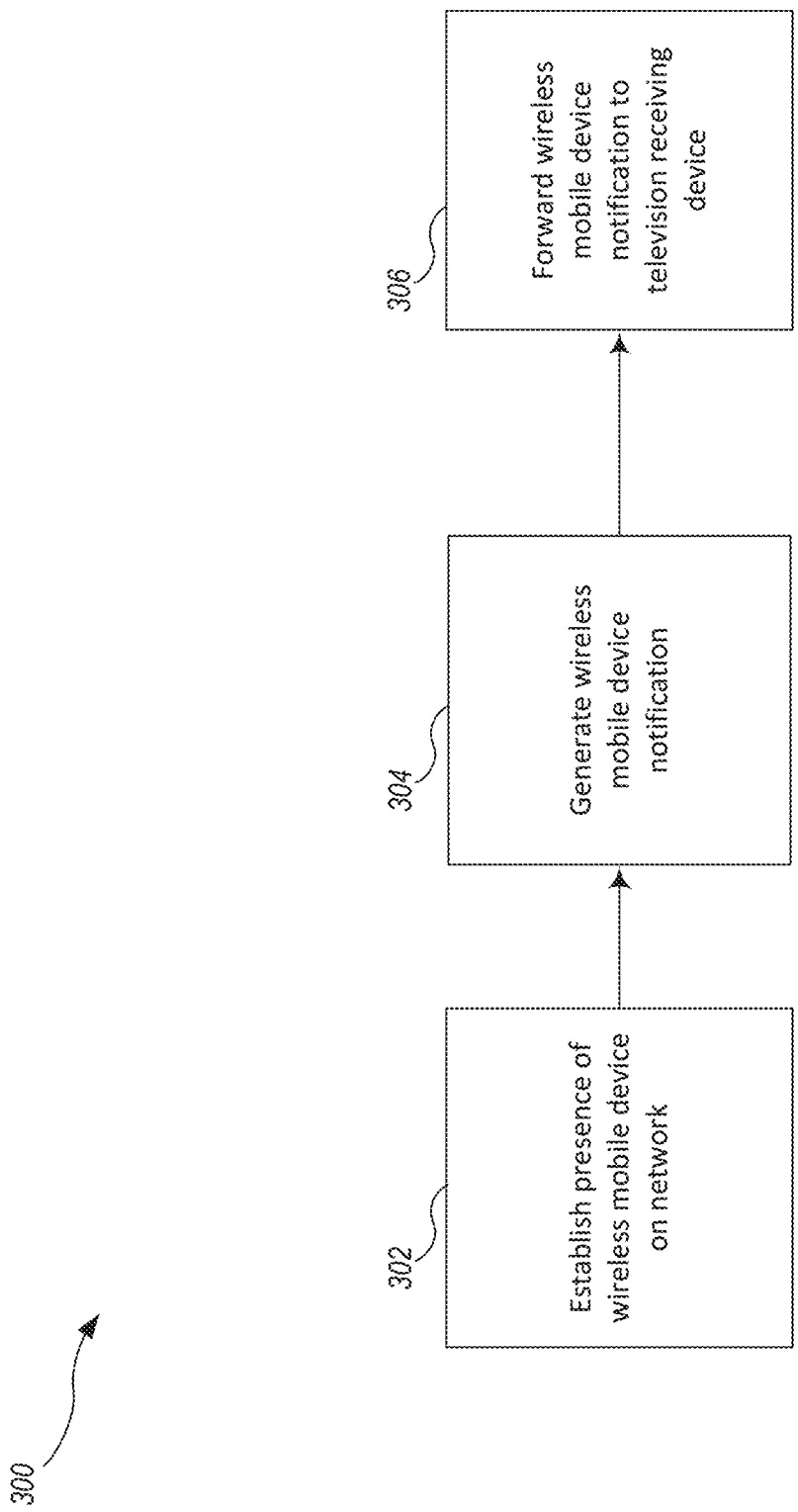
FIG. 3 is a flow diagram of a method of notification forwarding, according to a first example embodiment.

FIG. 3 is a flow diagram of a method 300 of notification forwarding, according to a first example embodiment.

At 302, a wireless mobile device establishes presence of the wireless mobile device on a short-range wireless network or on a wireless local area network on which a television receiving device is also present.

At 304, the wireless mobile device generates a wireless mobile device notification for a user of the wireless mobile device for display on a display of the wireless mobile device.

At 306, in response to the generating the wireless mobile device notification for the user of the wireless mobile device for display on a display of the wireless mobile device, the wireless mobile device forwards the wireless mobile device notification to the television receiving device over the short-range wireless network or on the wireless local area network on which wireless mobile device has established a presence and on which the television receiving device is also present. The forwarding of the wireless mobile device notification to the television receiving device enables display of the wireless mobile device notification on a presentation device connected to the television receiving device.

Figure 4:
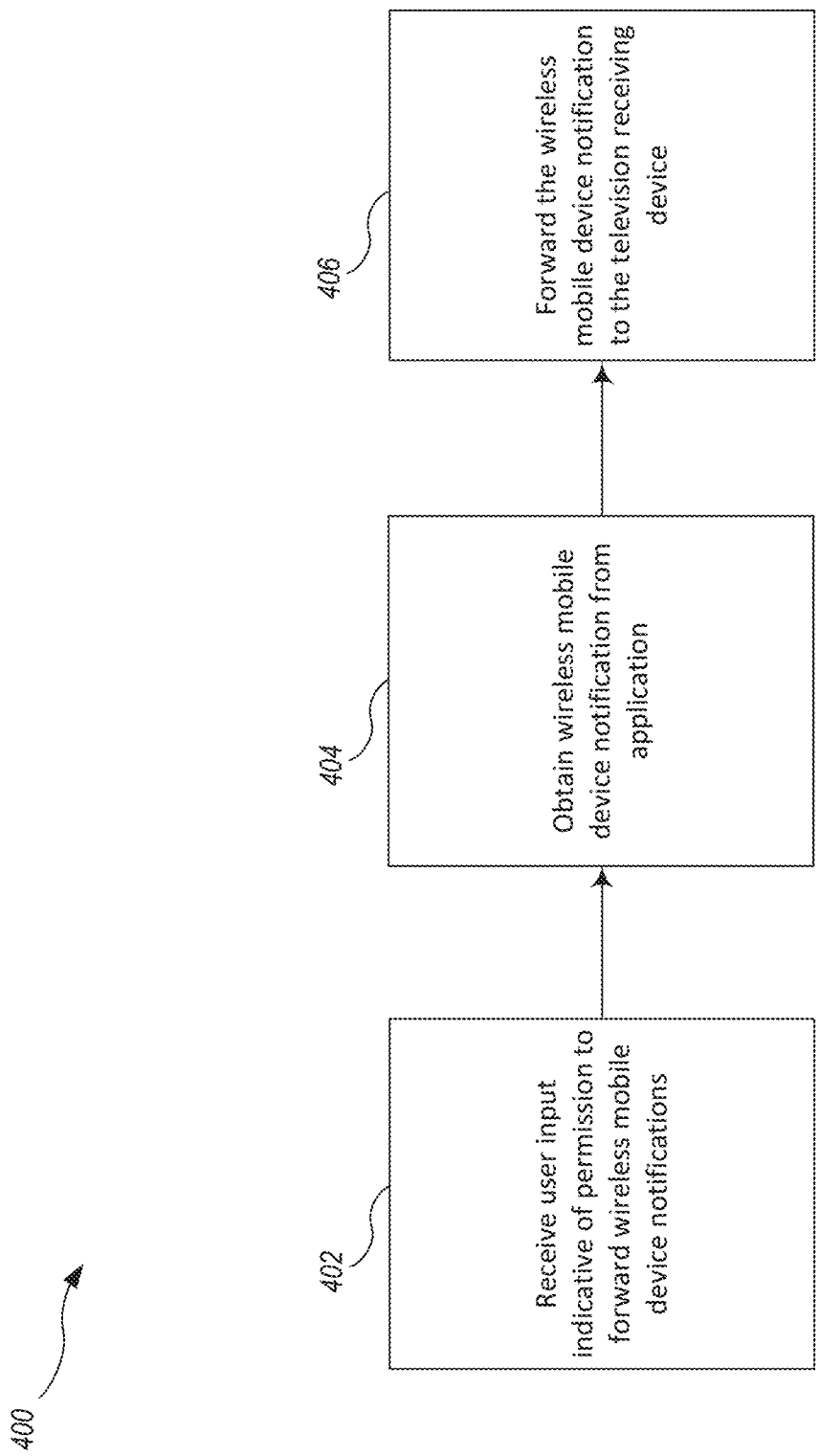
FIG. 4 is a flow diagram of a method of notification forwarding, according to a second example embodiment.

FIG. 4 is a flow diagram of a method 400 of notification forwarding, according to a second example embodiment. For example, the method 400 may be useful in the method 300 of notification forwarding.

At 402, the wireless mobile device receives user input indicative of permission to forward wireless mobile device notifications to the television receiving device for display on the presentation device connected to the television receiving device. For example, this may be for wireless mobile device notifications generated from all or a selected group of various mobile device applications running on the wireless mobile device.

At 404, a television receiving device management application running on at least one computer processor of the wireless mobile device obtains the wireless mobile device notification from another application running on the wireless mobile device that generated the wireless mobile device notification. For example, this may be in response to the generating the wireless mobile device notification for the user of the wireless mobile device for display on the display of the wireless mobile device.

At 406, the television receiving device management application of the wireless mobile device forwards the wireless mobile device notification from the other application running on the wireless mobile device to the television receiving device. This enables display of the wireless mobile device notification on the presentation device connected to the television receiving device.

Figure 5:
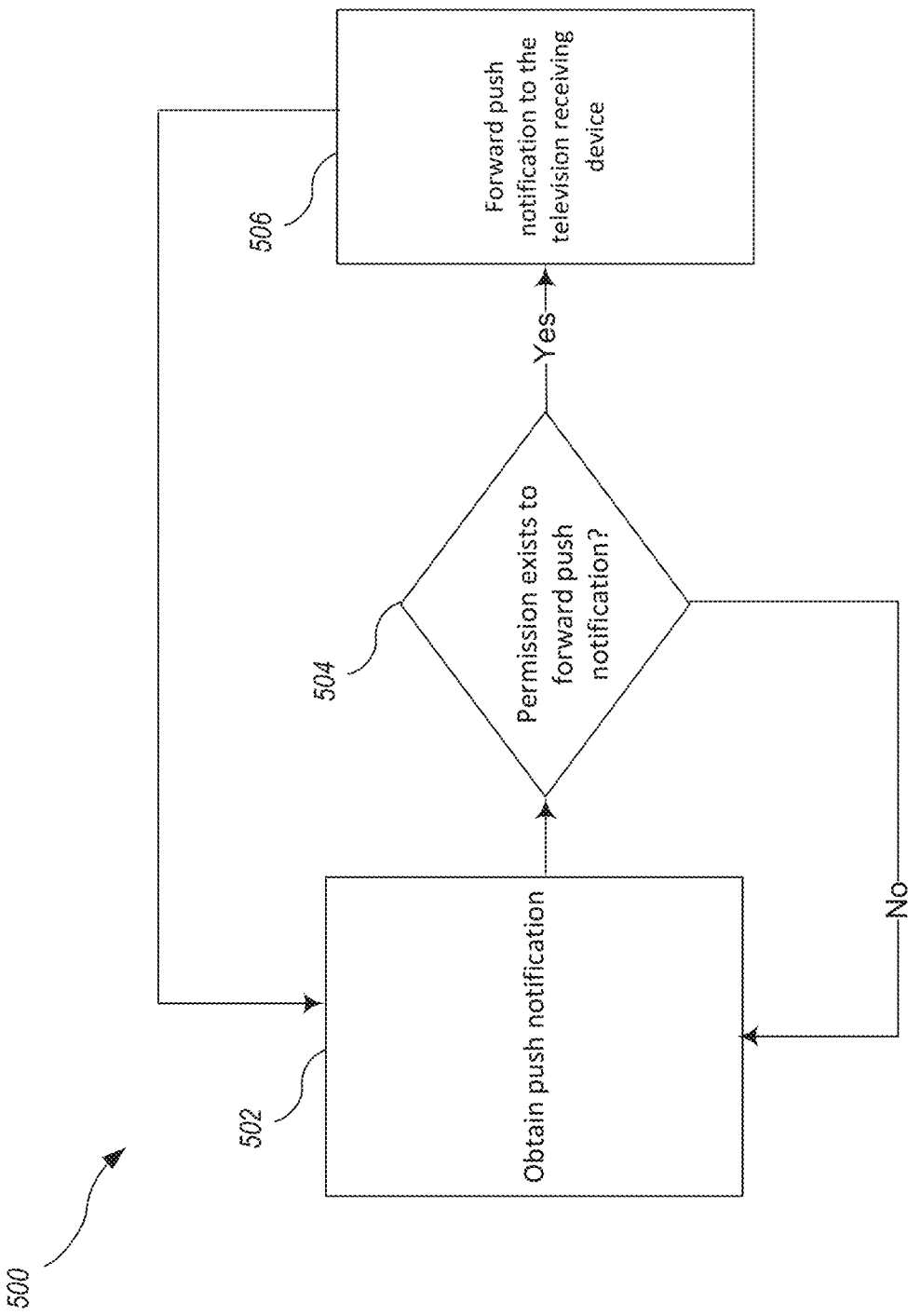
FIG. 5 is a flow diagram of a method of notification forwarding, according to a third example embodiment.

FIG. 5 is a flow diagram of a method 500 of notification forwarding, according to a third example embodiment. For example, the method 400 may be useful in the method 400 of notification forwarding.

At 502, the television receiving device management application running on at least one computer processor of the wireless mobile device, obtains one of a plurality of push notifications, each generated by different applications running on the wireless mobile device. For example, this may be as each push notification is generated by the respective application running on the wireless mobile device.

At 504, the television receiving device management application of the wireless mobile device determined whether permission has been granted to forward the push notification to the television receiving device, enabling display of the push notification on the presentation device connected to the television receiving device. If the television receiving device management application of the wireless mobile device determines that permission has not been granted to forward the push notification to the television receiving device, then the method proceeds to 502 to obtain another push notification generated by the wireless mobile device. If the television receiving device management application of the wireless mobile device determines that permission has been granted to forward the push notification to the television receiving device, then the method proceeds to 506.

At 506, the television receiving device management application forwards the push notification to the television receiving device based on the determination that permission has been granted to forward the push notification to the television receiving device. The method then proceeds to 502 to obtain another push notification generated by the wireless mobile device.

Figure 6:
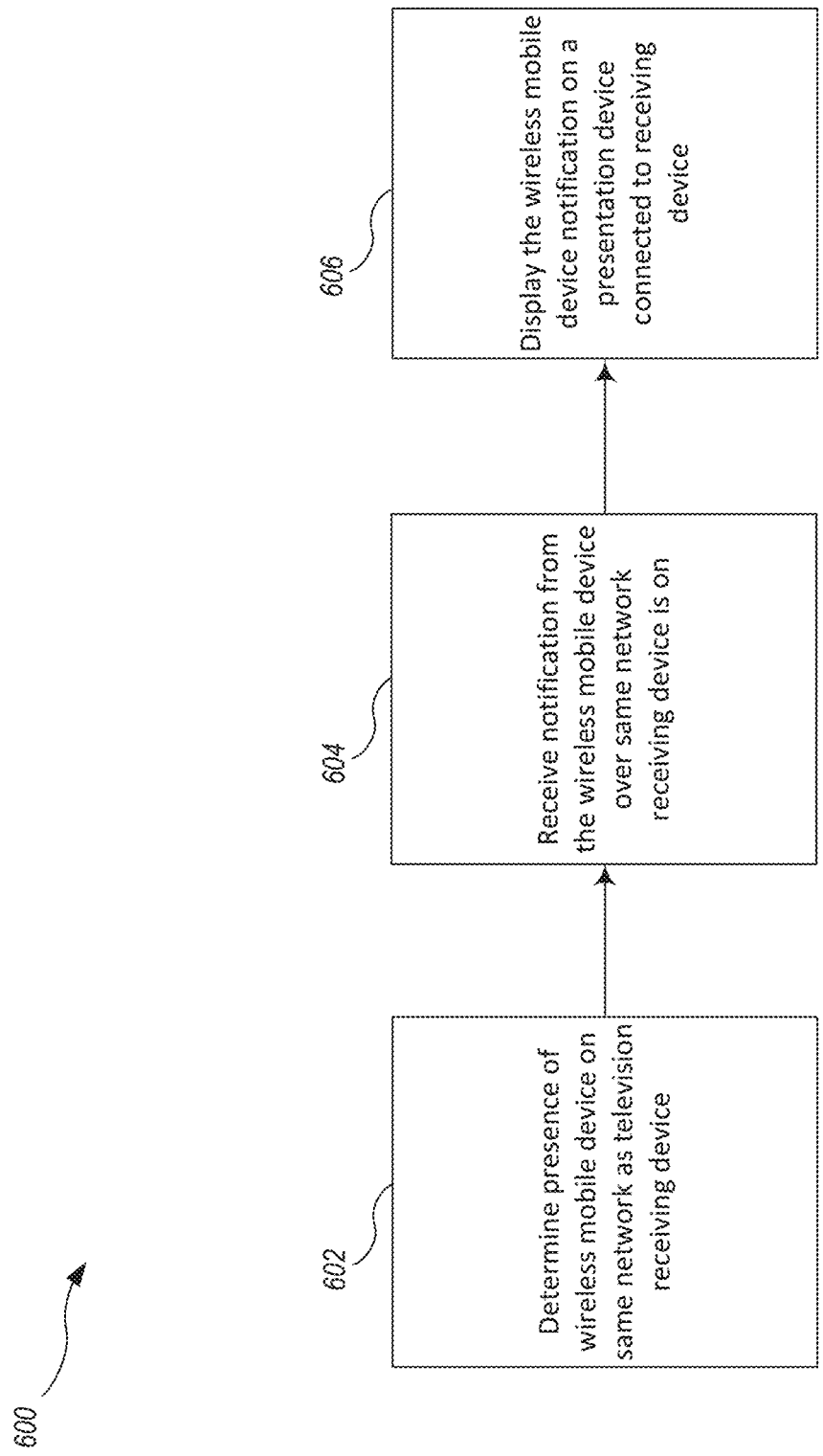
FIG. 6 is a flow diagram of a method of displaying wireless mobile device notifications according to an example embodiment.

FIG. 6 is a flow diagram of a method 600 of displaying wireless mobile device notifications according to an example embodiment.

At 602, the television receiving device determines presence of a wireless mobile device on a short-range wireless network or on a wireless local area network on which the television receiving device is also present.

At 604, the television receiving device receives, from the wireless mobile device, a wireless mobile device notification for a user of the wireless mobile device over the short-range wireless network or the wireless local area network on which the television receiving device is also present.

At 606, in response to receiving the wireless mobile device notification from the first wireless mobile device, the television receiving device displays the wireless mobile device notification on a presentation device connected to the television receiving device while the presentation device displays programming received from the television receiving device.

Figure 7:
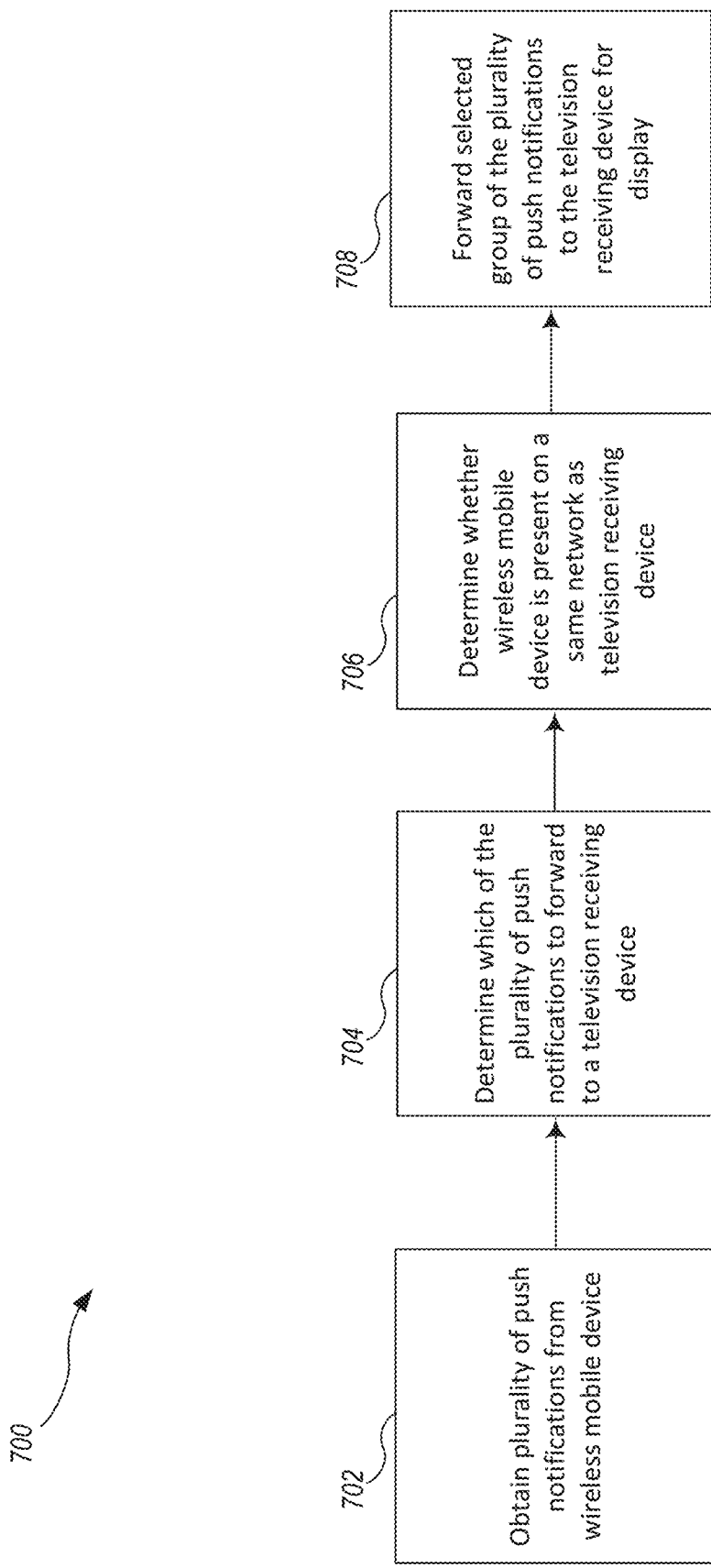
FIG. 7 is a flow diagram of a method of forwarding a selected group of notifications, according to an example embodiment.

FIG. 7 is a flow diagram of a method 700 of forwarding a selected group of notifications, according to an example embodiment.

At 702, a television receiving device management application running on a wireless mobile device obtains a plurality of push notifications, each generated by different applications running on the wireless mobile device.

At 704, the television receiving device management application determines which of the plurality of push notifications to forward to a television receiving device based on user permission settings on the wireless mobile device.

At 706, the television receiving device management application determines whether the wireless mobile device is present on a same short-range wireless network or on a same wireless local area network as the television receiving device.

At 708, the television receiving device management application forwards a selected group of the plurality of push notifications to the television receiving device for display of the selected group of the plurality of push notifications on a presentation device connected to the television receiving device. The forwarding may be based on a determination by the television receiving device management application that the wireless mobile device is present on the same short-range wireless network or on the same wireless local area network as the television receiving device. The selected group may be of the plurality of push notifications may be forwarded as they are generated by the wireless mobile device or as a group or batch to the television receiving device.

While various embodiments have been described hereinabove, it is to be appreciated that various changes in form and detail may be made without departing from the spirit and scope of the invention(s) presently or hereafter claimed.

The invention claimed is:

1. A computer-implemented method, comprising:
  establishing, by at least one computer processor of a wireless mobile device, presence of the wireless mobile device on a short-range wireless network or on a wireless local area network on which a television receiving device is also present;
  displaying, by at least one computer processor of the wireless mobile device, a graphical user interface of a television receiving device management application running on the wireless mobile device providing a selection of options to indicate which mobile device applications of a plurality of mobile device applications running on the mobile device is to have push notifications forwarded from the mobile device to a television receiving device;

receiving, by at least one computer processor of the wireless mobile device, a selection, via the graphical user interface, of which mobile device applications of a plurality of mobile device applications running on the mobile device is to have push notifications forwarded from the mobile device to a television receiving device;

generating, by at least one computer processor of the wireless mobile device, a wireless mobile device notification for a user of the wireless mobile device for display on a display of the wireless mobile device; and in response to the generating the wireless mobile device notification for the user of the wireless mobile device for display on the display of the wireless mobile device, and based on the selection, via the graphical user interface, of which mobile device applications of a plurality of mobile device applications running on the mobile device is to have push notifications forwarded from the mobile device to a television receiving device, forwarding, by at least one computer processor of the wireless mobile device, the wireless mobile device notification to the television receiving device over the short-range wireless network or on the wireless local area network on which wireless mobile device has established a presence and on which the television receiving device is also present, wherein the forwarding the wireless mobile device notification to the television receiving device includes:

determining, by at least one computer processor of the wireless mobile device, a level of detail of the wireless mobile device notification to display on the presentation device connected to the television receiving device based on input received by the wireless mobile device indicative of selection of one or more of selectable options for the user to choose regarding a level of detail of wireless mobile device notifications to display on the presentation device;

editing, by at least one computer processor of the wireless mobile device, the wireless mobile device notification based on the determined level of detail of the wireless mobile device notification to display on the presentation device connected to the television; and after the editing, forwarding, by at least one computer processor of the wireless mobile device, the edited wireless mobile device notification to the television receiving device over the short-range wireless network or on the wireless local area network on which wireless mobile device has established a presence and on which the television receiving device is also present.

2. The method of claim 1 wherein the wireless mobile device notification is a push notification generated by an application running on the wireless mobile device.

3. The method of claim 1 further comprising:
displaying, by at least one computer processor of the wireless mobile device, a graphical user interface selection menu on the display of the wireless mobile device, the graphical user interface selection menu providing selectable options for the user to choose regarding whether to enable the wireless mobile device to forward wireless mobile device notifications to the television receiving device for display on the presentation device connected to the television receiving device.

4. The method of claim 3 further comprising:
receiving, by at least one computer processor of the wireless mobile device, user input on the wireless mobile device indicative of a selection of one of the selectable options;

in response to receiving the user input on the wireless mobile device indicative of a selection of one of the selectable options, enable, by at least one computer processor of the wireless mobile device, the wireless mobile device to forward wireless mobile device notifications to the television receiving device for display on the presentation device connected to the television receiving device.

5. The method of claim 1 wherein the forwarding the wireless mobile device notification to the television receiving device, includes:

in response to the generating the wireless mobile device notification for the user of the wireless mobile device for display on the display of the wireless mobile device, obtaining, by a television receiving device management application running on at least one computer processor of the wireless mobile device, the wireless mobile device notification from another application running on the wireless mobile device that generated the wireless mobile device notification; and forwarding, by the television receiving device management application, the wireless mobile device notification from another application running on the wireless mobile device to the television receiving device, enabling display of the wireless mobile device notification on the presentation device connected to the television receiving device.

6. The method of claim 5 further comprising:
receiving, by a television receiving device management application running on at least one computer processor of the wireless mobile device, user input indicative of permission to forward wireless mobile device notifications to the television receiving device for display on the presentation device connected to the television receiving device.

7. The method of claim 6 further comprising:
obtaining, by the television receiving device management application running on at least one computer processor of the wireless mobile device, a plurality of push notifications, each generated by different applications running on the wireless mobile device; and for each of the plurality of push notifications, as each of the plurality of push notifications is generated:
determining, by the television receiving device management application, whether permission has been granted to forward the push notification to the television receiving device, enabling display of the push notification on the presentation device connected to the television receiving device; and forwarding, by the television receiving device management application, the push notification to the television receiving device based on a determination that permission has been granted to forward the push notification to the television receiving device.

8. The method of claim 1 further comprising:
displaying, by at least one computer processor of the wireless mobile device, a graphical user interface selection menu on the display of the wireless mobile device, the graphical user interface selection menu providing selectable options for the user to choose regarding a level of detail of wireless mobile device notifications to display on the presentation device connected to the television receiving device.

9. The method of claim 8 wherein the graphical user interface selection menu includes options selectable via the graphical user interface including:

displaying a generic message that a notification has been received, displaying information regarding a message sender, displaying information regarding type of content of the wireless mobile device notifications, displaying specific content of the wireless mobile device notifications and displaying full content of the wireless mobile device notifications.

10. The method of claim 8 wherein the forwarding the wireless mobile device notification to the television receiving device includes:
    determining a level of detail of the wireless mobile device notification to display on the presentation device connected to the television receiving device based on input received indicative of selection of one or more of the selectable options for the user to choose regarding the level of detail of wireless mobile device notifications to display on the presentation device;
    editing the wireless mobile device notification based on the determined level of detail of the wireless mobile device notification to display on the presentation device connected to the television; and
    forwarding the edited wireless mobile device notification to the television receiving device over the short-range wireless network or on the wireless local area network on which wireless mobile device has established a presence and on which the television receiving device is also present.

11. The method of claim 1 wherein the generating the wireless mobile device notification for a user of the wireless mobile device for display on a display of the wireless mobile device includes generating the wireless mobile device notification for a user of the wireless mobile device without displaying the wireless mobile device notification on the display of the wireless mobile device.

12. A notification forwarding system comprising:
    a television receiving device comprising:
        at least one television receiving device processor; and
        at least one memory coupled to the television receiving device processor; the at least one memory having computer executable instructions stored thereon that, when executed by the at least one television receiving device processor, cause the following to be performed:
            determine presence of a first wireless mobile device on a short-range wireless network or on a wireless local area network on which the television receiving device is also present;
            receive from the first wireless mobile device a wireless mobile device notification for a user of the first wireless mobile device over the short-range wireless network or the wireless local area network on which the television receiving device is also present; and
            in response to receiving the wireless mobile device notification from the first wireless mobile device, display the wireless mobile device notification on a presentation device connected to the television receiving device while the presentation device displays programming received from the television receiving device, wherein the displaying the wireless mobile device notification on the presentation device includes:
                determining a user account associated with the mobile device notification by using the mobile device notification to identify the user account associated with the mobile device notification;
                determining whether an indication has been received that a user associated with the user account is currently viewing the presentation device;
                based on the determination whether the indication has been received that the user associated with the user account is currently viewing the presentation device, retrieving user preferences associated with the user account indicating a level of detail of wireless mobile device notifications to display on the presentation device connected to the television receiving device; and
                displaying the wireless mobile device notification on the presentation device connected to the television receiving device according to the retrieved user preferences associated with the user account indicating a level of detail of wireless mobile device notifications to display on the presentation device; and
    a wireless mobile device comprising:
        at least one wireless mobile device processor; and
        at least one memory coupled to the wireless mobile device processor; the at least one memory coupled to the wireless mobile device processor having computer executable instructions stored thereon that, when executed by the at least one wireless mobile device processor, cause the following to be performed:
            establishing presence of the wireless mobile device on a short-range wireless network or on a wireless local area network on which a television receiving device is also present;
            displaying a graphical user interface of a television receiving device management application running on the wireless mobile device providing a selection of options to indicate which mobile device applications of a plurality of mobile device applications running on the mobile device is to have push notifications forwarded from the mobile device to a television receiving device;
            receiving a selection, via the graphical user interface, of which mobile device applications of a plurality of mobile device applications running on the mobile device is to have push notifications forwarded from the mobile device to a television receiving device:
            generating a wireless mobile device notification for a user of the wireless mobile device for display on a display of the wireless mobile device; and
            in response to the generating the wireless mobile device notification for the user of the wireless mobile device for display on the display of the wireless mobile device, and based on the selection, via the graphical user interface, of which mobile device applications of a plurality of mobile device applications running on the mobile device is to have push notifications forwarded from the mobile device to a television receiving device, forwarding the wireless mobile device notification to the television receiving device over the short-range wireless network or on the wireless local area network on which wireless mobile device has established a presence and on which the television receiving device is also present, wherein the forwarding the wireless mobile device notification to the television receiving device includes:
                determining a level of detail of the wireless mobile device notification to display on the presentation device connected to the television receiving device based on input received by the wireless mobile device indicative of selection of one or more of selectable options for the user to choose regarding a level of detail of wireless mobile device notifications to display on the presentation device;

editing the wireless mobile device notification based on the determined level of detail of the wireless mobile device notification to display on the presentation device connected to the television; and after the editing, forwarding the edited wireless mobile device notification to the television receiving device over the short-range wireless network or on the wireless local area network on which wireless mobile device has established a presence and on which the television receiving device is also present.

13. The television receiving device of claim 12 wherein the receiving from the first the wireless mobile device a wireless mobile device notification includes:

receiving, from a television receiving device management application running on the first wireless mobile device, a push notification generated by a different application running on the first wireless mobile device.

14. The television receiving device of claim 12 wherein the displaying the wireless mobile device notification on the presentation device includes:

based on the determination whether the indication has been received that the user associated with the user account is currently viewing the presentation device, displaying the wireless mobile device notification on the presentation device connected to the television receiving device.

15. The television receiving device of claim 12 wherein the computer executable instructions, when executed by the at least one television receiving device processor, further cause the following to be performed:

determine presence of a plurality of wireless mobile devices on a short-range wireless network or on a wireless local area network on which the television receiving device is also present;

receive, by the television receiving device, a plurality of push notifications over the short-range wireless network or on the wireless local area network on which the television receiving device is also present, each of the plurality of push notifications received from a different one of the plurality of wireless mobile devices; and for each of the plurality of push notifications, as each of the plurality of push notifications is received by the television receiving device, display the push notification on the presentation device connected to the television receiving device.

16. A non-transitory computer-readable storage medium having computer executable instructions thereon, that when executed by at least one computer processor, cause the following to be performed:

obtain by a television receiving device management application running on a wireless mobile device, a plurality of push notifications, each generated by different applications running on the wireless mobile device;

determine which of the plurality of push notifications to forward to a first television receiving device based on user permission settings on the wireless mobile device;

determine whether the wireless mobile device is present on a same short-range wireless network or on a same wireless local area network as the first television receiving device; and forward a selected group of the plurality of push notifications to the first television receiving device for display of the selected group of the plurality of push notifications on a first presentation device connected to the first television receiving device based on a determination that the wireless mobile device is present on the same short-range wireless network or on the same wireless local area network as the first television receiving device, the forwarding of the selected group of the plurality of push notifications to the television receiving device enabling determination by the television receiving device of a user account associated with the selected group of the plurality of push notifications, wherein the forwarding the selected group of the plurality of push notifications includes:

determining, by the wireless mobile device, a level of detail of the the selected group of the plurality of push notifications to display on the first presentation device connected to the first television receiving device based on input received by the wireless mobile device indicative of selection of one or more of selectable options for a user to choose regarding a level of detail of push notifications to display on the first presentation device;

editing, by the wireless mobile device, the selected group of the plurality of push notifications based on the determined level of detail of push notifications to display on the first presentation device; and after the editing, forwarding, by the wireless mobile device, the edited selected group of the plurality of push notifications to the television receiving device over the same short-range wireless network or on the same wireless local area network as the first television receiving device.

17. The non-transitory computer-readable storage medium of claim 16 wherein the wireless mobile device is a cellular telephone.

18. The non-transitory computer-readable storage medium of claim 16 wherein the forwarding the selected group of the plurality of push notifications to the television receiving device is further based on a determination that the first receiving device is a receiving device selected to receive push notifications according to user permission settings on the wireless mobile device.

19. The non-transitory computer-readable storage medium of claim 16 wherein the television receiving device is a cable or satellite television set-top box.

20. The non-transitory computer-readable storage medium of claim 16 wherein the computer executable instructions, when executed by at least one computer processor, cause the following to be performed:

determine which of the plurality of push notifications to forward to a second television receiving device based on user permission settings on the wireless mobile device indicating which multiple different television receiving devices have permissions to receive push notifications form the wireless mobile device;

determine whether the wireless mobile device is present on a same short-range wireless network or on a same wireless local area network as the second television receiving device; and forward a selected group of the plurality of push notifications to the second television receiving device for display of selected group of the plurality of push notifications on a second presentation device connected to the second television receiving device based on a determination that the wireless mobile device is present on the same short-range wireless network or on the same wireless local area network as the second television receiving device.

\* \* \* \* \*